US011640694B2

(12) United States Patent
Adkinson et al.

(10) Patent No.: US 11,640,694 B2
(45) Date of Patent: May 2, 2023

(54) 3D MODEL RECONSTRUCTION AND SCALE ESTIMATION

(71) Applicant: STREEM, INC., Portland, OR (US)

(72) Inventors: Sean M. Adkinson, North Plains, OR (US); Flora Ponjou Tasse, London (GB); Pavan K. Kamaraju, London (GB); Ghislain Fouodji Tasse, London (GB); Ryan R. Fink, Vancouver, WA (US)

(73) Assignee: STREEM, LLC, Portland, OR (US)

( * ) Notice: Subject to any disclaimer, the term of this patent is extended or adjusted under 35 U.S.C. 154(b) by 0 days.

(21) Appl. No.: 17/208,943

(22) Filed: Mar. 22, 2021

(65) Prior Publication Data

US 2021/0295599 A1 Sep. 23, 2021

Related U.S. Application Data

(60) Provisional application No. 62/992,324, filed on Mar. 20, 2020.

(51) Int. Cl.
| | | |
|---|---|---|
| *G06T 17/20* | (2006.01) | |
| *G06T 15/04* | (2011.01) | |
| *G06T 7/50* | (2017.01) | |
| *G06N 3/04* | (2023.01) | |
| *G06T 7/70* | (2017.01) | |

(52) U.S. Cl.
CPC ............... *G06T 17/20* (2013.01); *G06N 3/04* (2013.01); *G06T 7/50* (2017.01); *G06T 7/70* (2017.01); *G06T 15/04* (2013.01); *G06T 2207/10028* (2013.01); *G06T 2207/20084* (2013.01)

(58) Field of Classification Search
CPC ........... G06T 17/20; G06T 2207/10028; G06T 2207/20084
See application file for complete search history.

(56) References Cited

U.S. PATENT DOCUMENTS

| 2020/0218979 A1* | 7/2020 | Kwon | G06N 3/08 |
| 2021/0150792 A1* | 5/2021 | Ulyanov | G06N 20/00 |
| 2021/0279943 A1* | 9/2021 | Murez | G06N 3/02 |

OTHER PUBLICATIONS

Vosters et al., Efficient and Stable Sparse-to-Dense Conversion for Automatic 2-D to 3-D Conversion, Mar. 2013, IEEE Transactions on Circuits and Systems for Video Technology, vol. 23, No. 3, pp. 373-386 (Year: 2013).*
Wang et al., MVDepthNet: Real-time Multiview Depth Estimation Neural Network, 2018, IEEE DOI 10.1109/3DV.2018.00037, pp. 248-257 (Year: 2018).*

* cited by examiner

*Primary Examiner* — Samantha (Yuehan) Wang
(74) *Attorney, Agent, or Firm* — Schwabe Williamson & Wyatt

(57) ABSTRACT

Embodiments include systems and methods for creation of a 3D mesh from a video stream or a sequence of frames. A sparse point cloud is first created from the video stream, which is then densified per frame by comparison with spatially proximate frames. A 3D mesh is then created from the densified depth maps, and the mesh is textured by projecting the images from the video stream or sequence of frames onto the mesh. Metric scale of the depth maps may be estimated where direct measurements are not able to be measured or calculated using a machine learning depth estimation network.

18 Claims, 6 Drawing Sheets

3D MODEL RECONSTRUCTION AND SCALE ESTIMATION

CROSS-REFERENCE TO RELATED APPLICATIONS

This application claims the benefit of U.S. Provisional Application No. 62/992,324, filed on 20 Mar. 2020, the entire contents of which are hereby incorporated by this reference as if fully stated herein.

TECHNICAL FIELD

The present disclosure relates to the field of remote augmented reality (AR), and specifically to reconstruction of a 3D model (or "digital twin") and associated depth and camera data, and scale estimation from the reconstructed model and data, from a remote video feed.

BACKGROUND

Devices such as smartphones and tablets are increasingly capable of supporting augmented reality (AR). These devices may capture images and/or video and, depending upon the particulars of a given AR implementation, the captured images or video may be processed using various algorithms to detect features in the video, such as planes, surfaces, faces, and other recognizable shapes. Further, the captured images or video can be combined in some implementations with data from depth sensors such as LiDAR, and camera pose information obtained from motion data captured from sensors such as a MEMS gyroscope and accelerometers, which can facilitate AR software in recreating an interactive 3-D model. This 3-D model can further be used to generate and place virtual objects within a 3-D space represented by the captured images and/or video. These point clouds or surfaces may be associated and stored with their source images, video, and/or depth or motion data. In various implementations, the devices can be capable of supporting a remote video session with which users can interact via AR objects in real-time.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1:
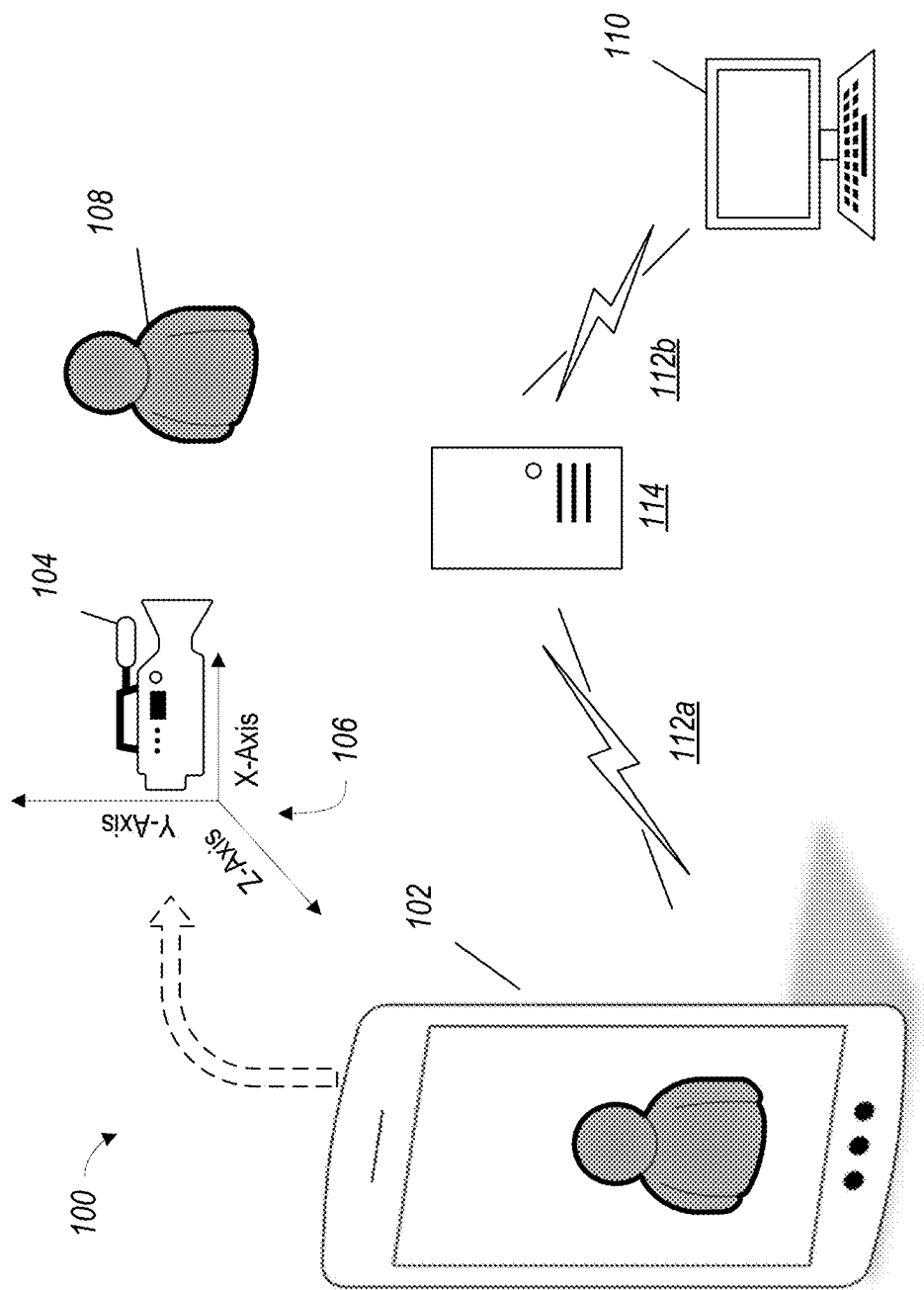
FIG. 1 illustrates a block diagram of the components of a system for capturing a video feed and corresponding AR data, according to various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

A device that supports AR typically provides an AR session on a device-local basis (e.g., not requiring communication with a remote system), such as allowing a user of the device to capture a video feed or stream using a camera built into the device, and superimpose AR objects upon the video as it is captured. Support for superimposing AR objects is typically provided by the device's operating system, with the operating system providing an AR application programming interface (API). Examples of such APIs include, but are not limited to, Apple's ARKit, provided by iOS, and Google's ARCore, provided by Android.

These APIs may provide depth data and/or a point cloud, which typically includes one or more points that are indicated by an x, y position within the video frame along with a depth (or z-axis). These x, y, and z values can be tied to one or more identified anchor features within the frame, e.g. a corner or edge of an object in-frame, which can be readily identified and tracked for movement between frames. Use of anchor features can allow the detected/calculated x, y, and z values to be adjusted from frame to frame relative to the anchor features as the camera of the capturing device moves in space relative to the anchor features. These calculated values allows AR objects to be placed within a scene and appear to be part of the scene, viz. the AR object moves through the camera's view similar to other physical objects within the scene as the camera moves. Further, by employing various techniques such object detection along with motion data (which may be provided by sensors on-board the device such as accelerometers, gyroscopes, compasses, etc.), the API can maintain track of points that move out of the camera's field of view. This allows a placed AR object to disappear off-screen as the camera moves past its placed location, and reappear when the camera moves back to the scene location where the AR object was originally placed.

The device may also be used to engage in a video communications session with a remote user, such as another device or system that is likewise capable of video communications. By transmitting or otherwise sharing the depth data and/or point cloud, the remote user can be enabled to insert AR objects into the video feed, which can then be reflected back to the device providing the video feed and subsequently tracked by the device as if placed by the device user.

However, where the video feed and associated depth and motion data are simply used to recreate the view on the capturing device for the remote user, the remote user is constrained in placing AR objects only to where the device user is currently pointing the device. The remote user cannot place or otherwise associate an AR object with any objects that are not currently in-frame. A solution to such a problem is to use the video feed and associated depth and motion data to progressively create a 3D model of the environment captured in the video feed. Thus, as the user of the capturing device pans the device about, the remote user is provided with a progressively expanding 3D model, which can be refined when the user of the capturing device pans back over areas that were previously captured. The remote user, in turn, can insert AR objects into the 3D model, which are then synchronized back into the AR view of the user of the capturing device.

Furthermore, where depth data is known in identifiable units, e.g. centimeters or meters, the 3D model can be correlated with the depth data to allow for virtual measurements to be made between potentially arbitrary points in the 3D model. Absent this information, relative measurements can be made within the model, but such measurements cannot be correlated to actual physical measurements without knowing at least some reference information, such as an actual distance from the camera to a point in the environment that reflects a real-world measurement.

Progressive creation of an accurate 3D model that also includes acceptably accurate real-world scaling ideally relies upon not only captured video, but also accurate depth data and camera pose information (e.g., camera orientation in space, movement of the camera in space, camera intrinsics such as lens focal length, lens aberrations, focal point, and aperture settings/depth of field, etc.). Some suitably equipped devices can provide direct and relatively precise measurements of this data using on board sensors such as LiDAR and MEMS sensors. However, not all devices may be suitably equipped to provide direct measurements. In some implementations, the AR API may provide a point cloud of depth data and/or the camera pose, calculated using on-board sensors; in such implementations, the remote user is provided the needed information without concern to how the capturing device derived the information. In other implementations, some or all of this data may be unavailable to the remote user for various reasons, e.g. insufficient bandwidth to transmit the data along with the video stream, failure to synchronize the data with associated frames in the video stream, lost or garbled data, or simply lack of capturing device capability to provide some or all of the data. Thus, there is a need for a way to determine needed depth and camera pose data for construction of a 3D model when such information is not available from the capturing device.

Disclosed embodiments include systems and methods that allow for reconstruction of a 3D model from a video stream even when depth data and/or camera pose information is missing. The missing data may be supplied by extrapolation from adjacent frames, such as by using Structure from Motion techniques, and/or by using machine learning/deep learning techniques to provide an estimate of depth information.

FIG. 1 illustrates an example system 100 that may allow capture of a video feed and camera pose information, and transmission of the same to a remote device, for interaction and placement of AR objects. System 100 may include a device 102, which may be in communication with a remote device 110. In the depicted embodiment of FIG. 1, device 102 is a smartphone, which may be implemented as a computer device 500, to be discussed in greater detail below. Other embodiments may implement device 102 as a variety of different possible devices, such as a computer (desktop or laptop), tablet, two-in-one, hybrid, smart glasses, or any other computing device that can accept a camera and provide necessary positional information, as will be discussed in greater detail herein. Device 102 further may include a camera 104 and may include one or more spatial position sensors 106 (depicted by a series of axes), to provide information about the spatial position of camera 104. In embodiments such as where device 102 is a smartphone, tablet, or laptop, camera 104 and spatial position sensors 106 may be contained within the body of device 102. In other embodiments, one or more of camera 104 and/or spatial position sensors 106 may be external to device 102, forming a system. For example, camera 104 and spatial position sensors 106 may be housed in an external camera unit that is connected to device 102, which may be a laptop, desktop, or similar type of computer device 500.

Camera 104 is used to capture the surrounding environment of device 102, and by extension, the user. The environment may include one or more three-dimensional objects 108. Camera 104 may be any camera that can provide a suitable video stream for the intended purpose of device 102. Where device 102 is implemented as a smartphone or tablet, camera 104 may be a built-in camera. In other embodiments, such as where device 102 is a laptop, camera 106 may be built in or a separate, external unit. A suitable video stream may be a digital video stream, and may be compressed in embodiments with some form of video compression, such as AVC-HD, H.264, MPEG-4, or another suitable compression scheme. Camera 104 may be configured to output standard or high-definition video, 4K video, or another resolution of video suitable for the intended purpose of camera 104 and device 102. The video stream may further include audio captured by one or more microphones (not pictured) in communication with the device. The video stream and any associated audio may comprise a video feed that is suitable for transmission, as will be discussed in greater detail herein.

Spatial position sensor(s) 106 may be configured to provide positional information about camera 104 that at least partially comprises camera pose information, such as camera 104's pan and tilt. Other measured positional vectors may include camera movements, such as the camera rising or falling, or moving laterally. Spatial position sensors 106 may be implemented with one or more micro and/or MEMS sensors, such as gyroscopes to measure angular movements, accelerometers to measure linear movements such as rises, falls, and lateral movements, and/or other suitable sensors such as a magnetic flux sensor to provide compass heading. In other embodiments, spatial position sensors 106 may be implemented using any suitable technology capable of measuring spatial movements of camera, including but not limited to depth sensors (not depicted).

In some embodiments, either the camera 104 or the spatial position sensor(s) 106 may be capable of making direct depth measurements. For example, either may include depth-sensing and/or range finding technology, such as LiDAR, stereoscopic camera, IR sensors, ultrasonic sensors, or any other suitable technology. In other embodiments, device 102 may be equipped with such depth-sensing or range finding sensors separately or additionally from camera 104 and spatial position sensor(s) 106.

Device 102 may be in communication with one or more remote devices 110, such as via a communications link 112. Remote device 110 may be any suitable computing device, such as computer device 500, that can be configured to receive and present a video feed from device 102 to a user of remote device 110. Remote device 110 may be the same type of device as device 102, or a different type of device that can communicate with device 102. Remote device 110 further may be capable of allowing a user to insert, remove, and/or manipulate one or more AR objects into the video feed, and further may allow the user to communicate with a user of device 102.

Communications links 112a and *b* between device 102, server 114, and remote device 110 may be implemented using any suitable communications technology or technologies, such as one or more wireless protocols like WiFi, Cellular (e.g., 3G, 4G/LTE, 5G, or another suitable technology), Bluetooth, NFC, one or more hardwired protocols like Ethernet, MoCA, Powerline communications, or any suitable combination of wireless and wired protocols. Communications links 112a and *b* may at least partially comprise the Internet. Communications links 112a and *b* may pass through one or more central or intermediate systems, which may include one or more servers, data centers, or cloud service providers, such as server 114. One or more of the central or intermediate systems, such as server 114, may handle at least part of the processing of data from the video feed and/or LiDAR from device 102, such as generating a 3D mesh and/or 3D model, digital twin, and/or may provide other relevant functionality. In embodiments, server 114 may execute some or all of methods 200, 300 and/or 400, described further below. In other embodiments, methods 200, 300 and/or 400 may be executed in part by any or all of device 102, server 114, and/or remote device 110.

Figure 2:
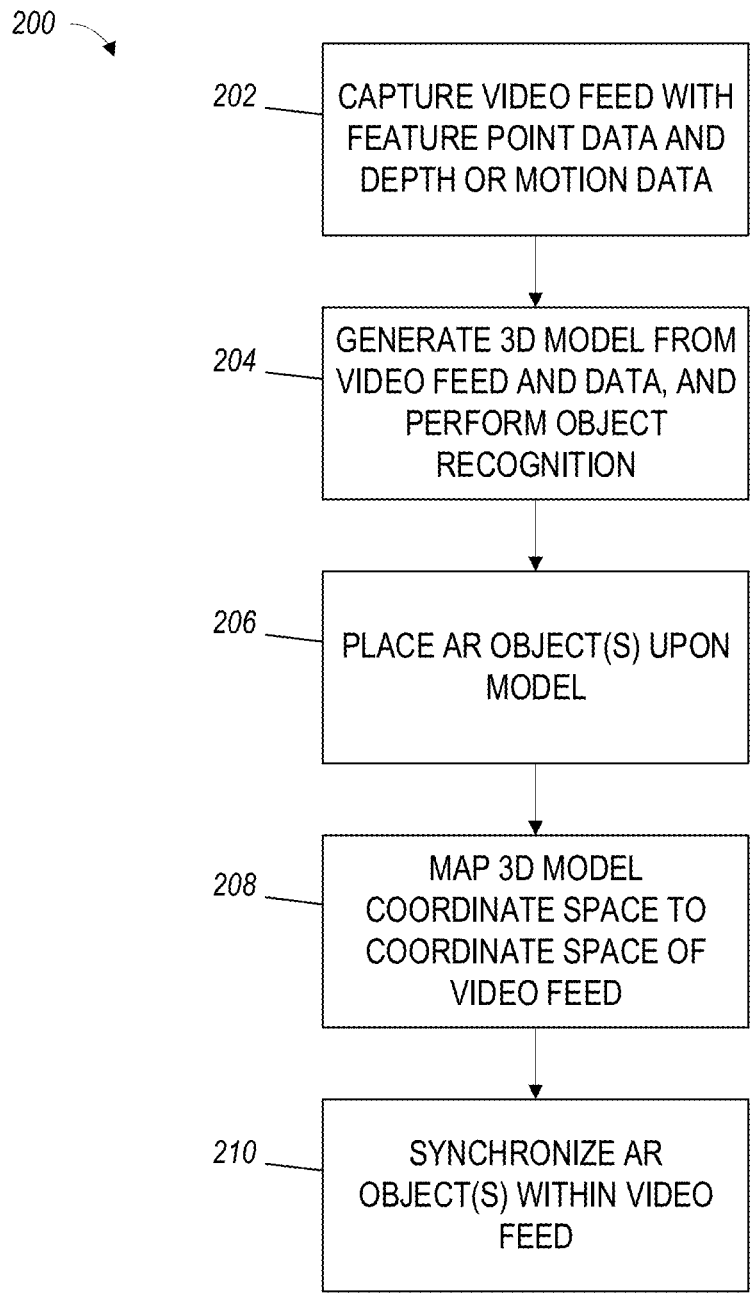
FIG. 2 is a flowchart of the operations of an example method for generating and interacting with a 3D model or digital twin from the video feed, and synchronizing objects between the model and video feed, according to various embodiments.

FIG. 2 depicts an example method 200 for placement of an AR object within a 3D model or mesh, where the AR object is reflected into a video stream from an end user device, such as device 102. Various embodiments may implement some or all of the operations of method 200, and the operations of method 200 may be performed in whole or in part, and may be performed out of order in some embodiments. Some embodiments may add additional operations.

In some embodiments, method 200 may be executed in whole or in part by server 114.

In operation 202, a video feed may be captured, along with associated depth and/or motion data as described above with respect to FIG. 1. The captured video may come from a variety of sources. In some examples, a camera 104 is used to capture the video, and one or more spatial position sensors 106 may be used to capture motion data, including camera pose information. In other examples, a different device or devices may be used to capture the video feed, depth data and/or motion data. The video feed and associated depth/motion data may be captured at a previous time, and stored into an appropriate file format that captures the video along with the depth/motion data. In some embodiments, the motion data may include depth and/or point cloud information, which itself may have been computed from the motion data and video feed, such as will be discussed below with respect to methods 300 and 400. In other embodiments, and as mentioned above with respect to FIG. 1, either camera 104 or spatial position sensors 106, or a dedicated depth sensor, may directly capture depth data. The result from operation 202, in some embodiments, is a video feed with associated point cloud data, or raw motion data from which the point cloud data is computed.

In some embodiments, operation 202 may include or encompass one or more operations from methods 300 and/or 400, where the point cloud data is computed. In some such embodiments, operation 202 may be performed in whole or in part by server 114, which may include operations from methods 300 and/or 400.

Figure 3:
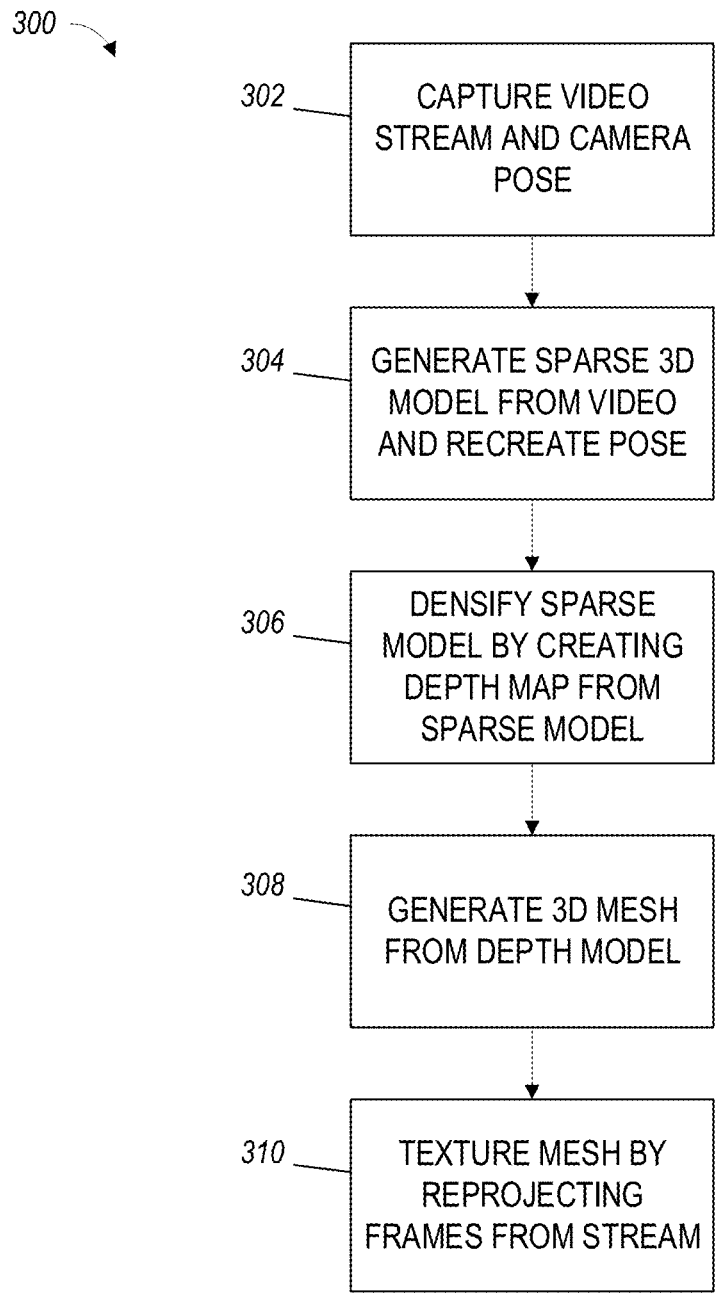
FIG. 3 is a flowchart of the operations of an example method for reconstruction of a 3D model and camera pose estimation using images from a video stream, according to some embodiments.

In operation 204, the video feed and depth data or motion data are used to construct a 3D model/digital twin with which a remote user can interact. The 3D model/digital twin may be constructed by first generating a 3D mesh from camera pose information and point cloud or other depth information. Image information from the video feed may then be integrated with the 3D mesh to form the 3D model/digital twin, such via a texture mapping process. In some embodiments, techniques known in the art may be used to generate the 3D mesh and/or the 3D model/digital twin. Method 300, described below with respect to FIG. 3, is one possible process that can be implemented to create a 3D mesh and texture it using images from the video feed to result in the 3D model.

Furthermore, in embodiments, object recognition may be performed on the 3D model/digital twin to detect various features, such as appliances, furniture, topographical features such as surfaces and/or shapes, or other various relevant features. In some embodiments, object recognition may be performed on the initial video stream prior to model generation, with the recognized features identified in the resulting 3D model/digital twin. In other embodiments, object recognition may be performed directly on the 3D model/digital twin. Generation of the 3D model/digital twin may by an iterative or continuous process, rather than a single static generation, with the model being expanded as the device providing the live video feed moves about its environment and captures new aspects. The 3D model/digital twin may also be updated in real time to accommodate environmental changes, such as objects being moved, new objects/features being exposed due to persons moving about, in, or out of the video frame, etc. This object recognition may be used as an input to a machine learning process such as a depth estimation network, discussed in greater detail below with respect to FIG. 4 and method 400.

Following generation of the 3D model/digital twin, in embodiments, it is made available to users remote devices in real-time, such as a user of remote device 110. In operation 206, a user may place, tag, or otherwise associate one or more AR objects within the 3D model/digital twin. The AR objects may be tagged or associated with one or more objects within the 3D model/digital twin, such as objects recognized via object recognition performed as part of operation 204. The position of such AR objects may be expressed with respect to the coordinates of some part of the tagged or associated object. The coordinates of the AR objects within the 3D model/digital twin coordinate system may be determined by resolving the reference to the tagged or associated object. Other AR objects may be tagged to a specified location within the 3D model/digital twin, with the location of such AR objects expressed in terms of the 3D model/digital twin's coordinate system rather than relative to the coordinates of an object.

The choice of how to express the location of a given AR object within the 3D model/digital twin may depend upon the nature of the AR object. For example, where an AR object is intended to relate to a recognized object, e.g. pointing out a feature of some recognized object, it may be preferable to locate the AR object relative to the recognized object, or some anchor point or feature on the recognized object. In so doing, it may be possible to persist the placement of the AR object relative to the recognized object even if the recognized object is subsequently moved in the video feed, and the corresponding 3D model/digital twin is updated to reflect the new position of the moved object. Likewise, it may be preferable to tie an AR object to an absolute location within the 3D model/digital twin when the AR object is intended to represent a particular spatial position within the environment of the video feed, e.g. the AR object is a piece of furniture or otherwise indicates a location in the area surrounding the device providing the video feed, such that tagging to a recognized object is unnecessary or undesirable.

As will be understood, the AR objects may be two-dimensional or three-dimensional objects, such as may be provided by an image library or 3D object library. Placement of the AR objects can include determining of AR object orientation within the model, e.g. its location within a 3D coordinate space as well as rotational orientation relative to three axes, pitch, yaw, and roll, so that the AR object is expressed in at least six degrees of freedom.

In operation 208, the coordinate space of the 3D model/digital twin is mapped to the coordinate space of the video feed. The 3D model/digital twin may be represented in a 3D coordinate space with reference to an origin point, which may be arbitrarily selected. In some embodiments, the origin may be relocated or shift as the 3D model/digital twin evolves, such as where the 3D model/digital twin is continuously generated and expanded as the video feed progresses. The point of view of the camera may change, such as due to the user of the device providing the video feed moving the device about. While depicted as a single step, it should be understood that in some embodiments, the coordinate space between the 3D model/digital twin and video feed may be continuously reconciled.

One possible way in some embodiments of mapping the coordinate space of the 3D model/digital twin with the video feed includes correlation of anchor points. As mentioned above, one or more anchor points may be identified from the video feed. These anchor points serve as locations within the environment around the capturing device that can be repeatably and consistently identified when the point moves out of and back into frame. These anchor points can be identified, tagged, or otherwise associated with corresponding objects within the 3D model/digital twin, such as by specifically identifying the anchor points in point cloud data, which is then used in the process of 3D model/digital twin generation. The identified points in the 3D model/digital twin that correspond to the anchor points in the video feed thus provide fixed reference points common between the coordinate spaces of the 3D model/digital twin and video feed. By comparing the expression of the location of a given anchor point within the 3D model/digital twin to its corresponding location expression within the video feed, the various mathematical factors needed to translate between the two coordinate systems can be determined. With this information, the position of the object placed within the 3D model/digital twin can be translated to positional information for placement within the video feed coordinate space.

The mathematical factors may include scale amounts, for example to correlate the relative sizes and distances of objects within the video feed with objects generated in the 3D model/digital twin, as well as placed AR objects. These scale amounts can also be useful for making measurements within the 3D model/digital twin, e.g. distances, sizes, volumes, etc., and having these measurements accurately reflect the environment surrounding the device providing the video feed. Scale amounts may be calculated as part of method 400, described below with respect to FIG. 4.

In operation 210, the AR object(s) remotely placed in operation 206 are synchronized back to the video feed, using the mapping between the 3D model/digital twin coordinate space and video feed coordinate space established in operation 208. As a result, a user interacting with the 3D model/digital twin can place one or more AR objects within the model at location(s) that are currently out of frame from the video feed, and have the one or more AR objects appear in the video feed at their correct placed locations once the device providing the video feed moves to place the locations of the AR objects into frame. The appearance of the AR objects may also be generated with respect to the AR object's orientation, e.g. pitch, roll, and yaw, as discussed above with respect to operation 206. Thus, in operation 210 the AR objects are rendered for the video feed with respect to the point of view of the device providing the video feed, rather than the point of view of the user of the 3D model/digital twin who is placing the AR objects.

Depending upon the capabilities of an implementing system or device, method 200 may be performed progressively while the video is being captured, or may be performed on a complete captured video and associated AR data. As suggested above, in some embodiments the 3D model/digital twin may be computed on the fly, in real time, from the video feed, and/or depth or motion data as described above in operation 202, from a user device. As it is being generated, the model/digital twin may be updated in real-time if the environment captured in the video feed changes, such as by moving of one or more objects.

It should be appreciated by a person skilled in the art that some or all of method 200 may be performed by one or more components of system 100. For example, device 102 may provide the video feed and at least part of the depth data, motion data and/or point cloud data. The user of the remote device 110 may interact with the 3D model/digital twin, including placement of one or more 3D objects that are reflected back into the video feed or scene. Any one of the remote device 110, server 114, and/or device 102 may be responsible for generation of the 3D model/digital twin, and/or another remote system, such as a central server, cloud server, or another computing device that may be part of the communications link 112.

Furthermore, some or all of the operations of method 200 may be performed off-line, post-capture, rather than in real time during the video feed. For example, the video feed may be stored, either on device 102, sever 114, remote device 110, or another remote system. The 3D model/digital twin may be subsequently generated following video feed capture, and/or AR objects placed within the 3D model/digital twin following video feed completion and capture. The video feed in turn may be associated with a stored version of the 3D model/digital twin (or the 3D model/digital twin generated on the fly from the stored video feed), with AR objects subsequently placed and then visible in subsequent playback of the video feed. In still other embodiments, the 3D model/digital twin may additionally or alternatively be tagged or associated with a geolocation corresponding to the capture of the video feed, such that a subsequent device capturing a new video feed in the associated geolocation can incorporate one or more of the AR objects placed within the associated 3D model/digital twin.

Further, it should be understood that, while the foregoing embodiments are described with respect to a device 102 that may provide a video feed, system 100 and/or method 200 may be adapted to work with other technologies, e.g. waveguides and/or other see-through technologies such as smart glasses or heads-up displays, which may project AR objects onto a view of the real world, rather than a video screen or electronic viewfinder. In such embodiments, for example, sensors including video, depth, and/or motion sensors, may be used to construct the 3D model or digital twin, with which the remote user may interact and place AR objects. The remote user may or may not see a video feed that corresponds to the user's view through device 102; in some embodiments, the remote user may simply see the 3D model/digital twin, which may be updated/expanded in real time as the user of device 102 moves above. AR objects placed in the 3D model/digital twin, rather than being overlaid on a video feed, would be projected onto the user's view of the real world through device 102 in synchronization with the 3D model/digital twin.

Finally, one or more operations of method 200, such as operation 210, may be performed in reverse. For example, a user may place an object into the video feed, and have it reflect back into the corresponding 3D model or digital twin. Once the coordinate space of the 3D model/digital twin and video feed are mapped in operation 208, objects may be placed either in the model/twin or in the video feed, and be synchronized together.

Turning to FIG. 3, an example method 300 for recreating an environment in a textured 3D mesh from a video or similar series of frames capturing motion, according to some embodiments, is described. Various embodiments may implement some or all of the operations of method 300, and the operations of method 300 may be performed in whole or in part, and may be performed out of order in some embodiments. Some embodiments may add additional operations. In some embodiments, method 300 may be executed in whole or in part by server 114.

In operation 302, a video stream or other sequence of frames of a scene or environment is captured by a capturing device, such as by a device 102. In some embodiments and depending upon the capabilities of the capturing device, camera pose information may also be captured. The camera pose information may include rotational information such as camera pan, tilt, and yaw, translational information such as breadth, width, and depth movements, as well as camera intrinsic information such as focal length, image sensor format (e.g. sensor resolution, possibly expressed in x by y dimensions), focus point/distance, depth of field, aperture size (related to depth of field), lens distortion parameters (if known), etc. Depending upon the implementation, not all of this information may be available.

In operation 304, a sparse reconstruction of the environment captured in the video stream or sequence of frames is generated. The sparse reconstruction, in embodiments, includes generating a sparse depth map for each frame, each sparse depth map including at least one, if not multiple, depth or 3D points. The collection of sparse depth maps for each frame may be combined to form a sparse point cloud for the captured environment, such as by combining the depth or 3D points calculated for each sparse depth map into the sparse point cloud, so as to describe the various depth or 3D points for all or substantially all of the environment or scene captured in the video stream. In some embodiments, sparse depth maps may be acquired from multiple discrete video streams or sequences of frames that may have been captured at different times, but of a common environment. Provided there is at least some overlap in the captured environment, these sparse depth maps across the discrete video streams may be combined to create a single, unified sparse point cloud for all of the environment or scene captured across the multiple discrete video streams.

In some embodiments, the sparse reconstruction of each depth map is generated by starting with an initial pair of images, such as two consecutive or temporally proximate frames from the video stream (e.g. frame one is at time index n, the next frame at time index n+1, the following frame at time index n+2, etc.), which are compared to triangulate one or more identified points that are common between the two frames. Each pair of images is registered to each other to identify the common points. Camera pose information, if available, is further used to help register each successive image in the video stream or sequence of frames, and to determine depth values of the identified points for the sparse reconstruction. As the video stream or sequence of frames is processed, additional identified points form additional depth maps, which are added to the sparse reconstruction as more consecutive or temporally proximate frames are registered, until all frames of the video stream or sequence of frames intended to be used for the reconstruction have been processed. The result is the aforementioned sparse point cloud for the captured scene or environment. For example, the COLMAP software that is currently available may be used to generate the sparse reconstruction. The result of operation 304 is essentially a sparsely populated point cloud. Points may be identified using any number of known algorithms, such as edge and/or feature detection and correlation between adjacent frames.

In implementations where camera pose data is unavailable, method 300 may further include at least partially estimating the camera pose from registered frames. For example, camera movement may be inferred on the basis of how points identified as common between frames move between subsequent frames, on the basis of how identified shapes may alter between frames, and/or other visual cues. A feature identified as a trapezoid may shift in size, dimension, and frame position between frames, allowing rotational and/or translational camera movements to be inferred. Further, some camera intrinsics such as image size may be ascertained on the basis of video resolution (e.g. a full HD video would have frames that are each approximately 1920× 1080). In some implementations, camera intrinsic values may be supplied by a user, such as a user of device 102, or may be obtained from an external source such as a database if, for example, the make and model of the device 102 or camera 104 is known. However, without knowing certain camera intrinsics such as focal length, focal point, and depth of field, it may be difficult or impossible to determine the metric scale to assign a real-world distance to each point in the sparse reconstruction. In such cases, method 400, discussed below, may be used to estimate metric scale to allow real-world measurements.

Following creation of the sparse reconstruction, in operation 306 the sparse reconstruction or model is densified, by creating and/or updating the depth map of each frame initially obtained from the sparse model. As with the sparse depth maps, the densified depth maps may be combined to form a densified point cloud for the entire captured scene or environment. In some embodiments, this may be performed by generating a depth map for images from either the video stream or the sequence of frames that have at least two neighboring images. Note that this is not necessarily temporal proximity, e.g. an image from a given frame has at least two frames temporally adjacent (where a frame at time n has a neighboring frame at time n−1 and another neighboring frame at time n+1, etc.), but rather spatially: an image is a neighbor to a second image if both images share some predetermined minimum number of sparse points visible in both images. The neighboring images are then compared and analyzed to determine additional common points to add to each depth map of the sparse reconstruction. Alternatively or additionally, the additional common points may be added directly to the sparse point cloud of the environment, or first added to an existing depth map which may be subsequently merged into the densified point cloud. It should be appreciated that the neighboring images may not have been previously compared during the initial generation of the sparse reconstruction if the images were not temporally proximate.

Following creation of a densified model, in operation 308 a 3D mesh of triangles is generated from the densified depth maps (or combined, the densified point cloud), using a suitable algorithm such as Volumetric TSDF (Truncated Signed Distance Function) Fusion, Poisson Reconstruction or Delaunay Reconstruction. The mesh may then be refined where there is identified an insufficient number of triangles, e.g. number of triangles for a given area of the model is below some predetermined threshold. In some cases, a lack of triangles may be indicative of an insufficient number of depth points in the depth map, which may be supplemented using additional analysis and/or additional images, if available.

Finally, in operation 310, the 3D mesh is textured by reprojecting the various images from the video or sequence of frames onto the 3D mesh. This is facilitated by the image registration performed in operation 304 as well as the densification of operation 306, where spatially adjacent or proximate frames, e.g. sharing a predetermined number of common identified points, are identified.

It should be appreciated that method 300 can be performed in a single pass on a recorded video, or may be performed iteratively in real time on an on-going video stream. Thus, where performed in real time, operations 304, 306, 308, and 310 may be performed in a loop and/or simultaneously, as the 3D model is progressively constructed, densified, and textured, with the model being refined as the capturing device pans back over previously captured areas of the environment, enabling refining of details.

Figure 4:
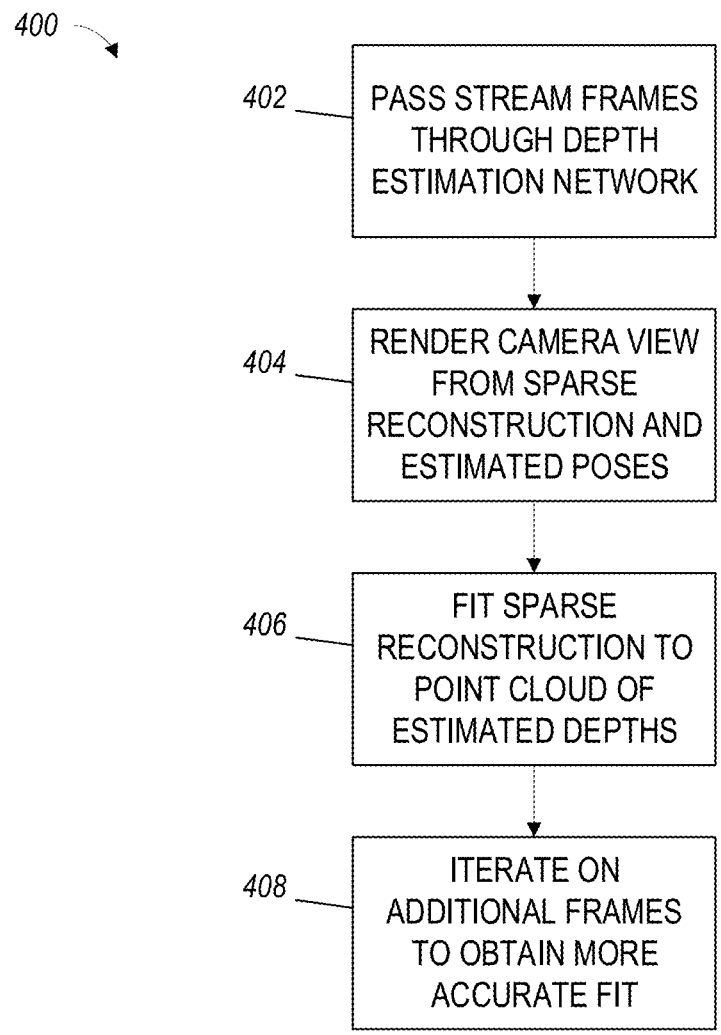
FIG. 4 is a flowchart of the operations of an example method for recreating depth information and recovering scale for a reconstructed 3D model, such as a model produced using the operations of the example method of FIG. 3, according to various embodiments.

In FIG. 4, an example method 400 for estimating metric scale from a video or similar series of frames capturing motion, according to some embodiments, is described. Metric scale estimation can help at least partially recreate absolute depth information from a video or sequence of frames where either such depth information was not computed or captured, or camera pose or other camera intrinsic information is unavailable to provide a reference point for determining depth values for various points within the environment captured in the video. For example, if camera pose information relating to camera movement is not available, the amount of distance between a first frame and a second frame traveled by the camera may not be known. Without knowing this distance, the depth (distance from camera) of various points calculated from the first and second frames cannot be known absolutely, but rather can only be expressed in some value relative to the camera position. For example, without knowing if the camera moved 1 cm or 1 mm between sequential frames or having some other reference of scale (e.g. knowing before-hand the actual size of a captured and identified object), depths could only be expressed in some unit-less metric relative to the camera position. It would be otherwise unknown if a depth from the camera to a point of reference in the captured scene should be expressed in meters, decimeters, or some other unit.

Various embodiments may implement some or all of the operations of method 300, and the operations of method 300 may be performed in whole or in part, and may be performed out of order in some embodiments. Some embodiments may add additional operations. In some embodiments, method 300 may be executed in whole or in part by server 114.

In operation 402, in some embodiments, images from the video stream or sequence of frames may be initially passed through a depth estimation network. If available, camera intrinsics may also be supplied to the depth estimation network. The depth estimation network may be a machine learning network, such as a convolutional neural network, deep learning network, multi-layer neural network, deep neural network, or another suitable artificial intelligence (AI) system. The depth estimation network may be trained on sets of various images with corresponding depth maps that provide actual (real-world) metric scale on objects within the various images. For example, a depth estimation network may be trained on images of various appliances and household fixtures, along with associated depth maps for each of the appliances and fixtures that provides typical actual metric scale for each object. Other possible training sets may include dimensions for rooms in relation to objects, e.g. a room size that includes a bed, where the bed and room measurements provide a reference scale from which different size rooms can be determined based on proportions between walls and surfaces and the bed. Still other possible training sets may include scenes such as kitchen, living room, library, bathroom, bedroom, retail store, etc. The result of passing the images through the depth estimation network is an estimated depth map for the various frames.

In operation 404, which may be executed before, after, or in parallel with operation 402, the scene from video stream or sequence of frames is rendered into a camera view. This rendering may be performed on a sparse reconstruction, e.g. sparse depth map, such as obtained in operation 304 of method 300 above, coupled with the estimated camera poses that are determined as part of operation 304. This reconstruction results in a rendering from a camera perspective that is in the same spatial domain as the estimated depth map, which likewise obtained from images presented from the camera perspective by virtue of being captured by the camera.

In operation 406, the rendered camera view is fit to the estimated depth map resulting from operation 402, using a suitable algorithm such as a Procrustes analysis. Essentially, operation 406 involves resizing the estimated depth map and rendered depth map until an approximate fit is achieved. The necessary resizing indicates the scale factor, which can be used to translate the depth map resulting from sparse reconstruction, e.g. from operation 304, into a metric scale useful for real-world measurements. As the depth map from operation 402 is an estimate, the estimated depth map may not be able to be perfectly fit to the depth map of the rendered view from operation 404. The difference in fit, e.g. imperfect fit, can be quantified as a disparity measure. Where the disparity is zero, a perfect fit has been obtained, and the estimated metric scale a. By implication, the more the disparity deviates from zero, the more imperfect the fit, and the more likely the estimated metric scale may not reflect actual real world metrics. In a sense, the disparity measurement reflects an accuracy confidence in how likely the estimation of metric scale is real-world accurate, with a 0 disparity indicating the highest likelihood/highest confidence that the estimated metric scale is real-world accurate.

Finally, in operation 408, the process is iterated incorporating additional frames to obtain a more accurate fit, e.g. lower the disparity measurement closer to zero. As with operation 306 of method 300, the process may be iterated using additional spatially proximate frames, which may not necessarily be temporally proximate, through the depth estimation network to improve and refine the metric scale estimation. In some implementations, previous analyses may be fed back into the depth estimation network to further train the network to improve accuracy. Alternatively or additionally, the depth estimation network may be trained periodically using scenes captured with directly measured depth data, such as by a LiDAR scan or other suitable ranging technology.

As an alternative to method 400, where one or more spatial position sensors, such as spatial position sensors 106, provide sufficient data, the spatial position information from the various sensors as part of the camera pose may be used to calculate estimated depths, using a process known as sensor fusion. Camera movements may be measured by an inertial measurement unit, which may include one or more accelerometers. Accelerometer measurements can be used to determine an actual physical distance traveled between two given frames by the camera, while gyroscopic measurements can determine any angular changes. With these measurements, matrix arithmetic and trigonometry can be used to calculate actual metric scale for the various points comprising the depth map. It will be understood that method 400 or sensor fusion is unnecessary where depth points can be directly measured across a video stream, such as where a device 102 is equipped with a direct depth sensing/measuring technology, like a LiDAR sensor.

It should be appreciated that, as with method 300, method 400 can be performed in a single pass on a recorded video, or may be performed iteratively in real time on an on-going video stream. Where performed in real time, all operations 402, 404, 406, and 408 may be performed in a loop and/or simultaneously, as the estimated metric scale of the video stream is refined as the capturing device pans back over previously captured areas of the environment and enables refining of details. Furthermore, method 400 may be used in conjunction with method 300 to provide metric scale estimation where insufficient camera pose data is supplied.

Finally, method 300 and, where needed, method 400 may be performed as part of operation 204 of method 200 (FIG. 2).

Figure 5:
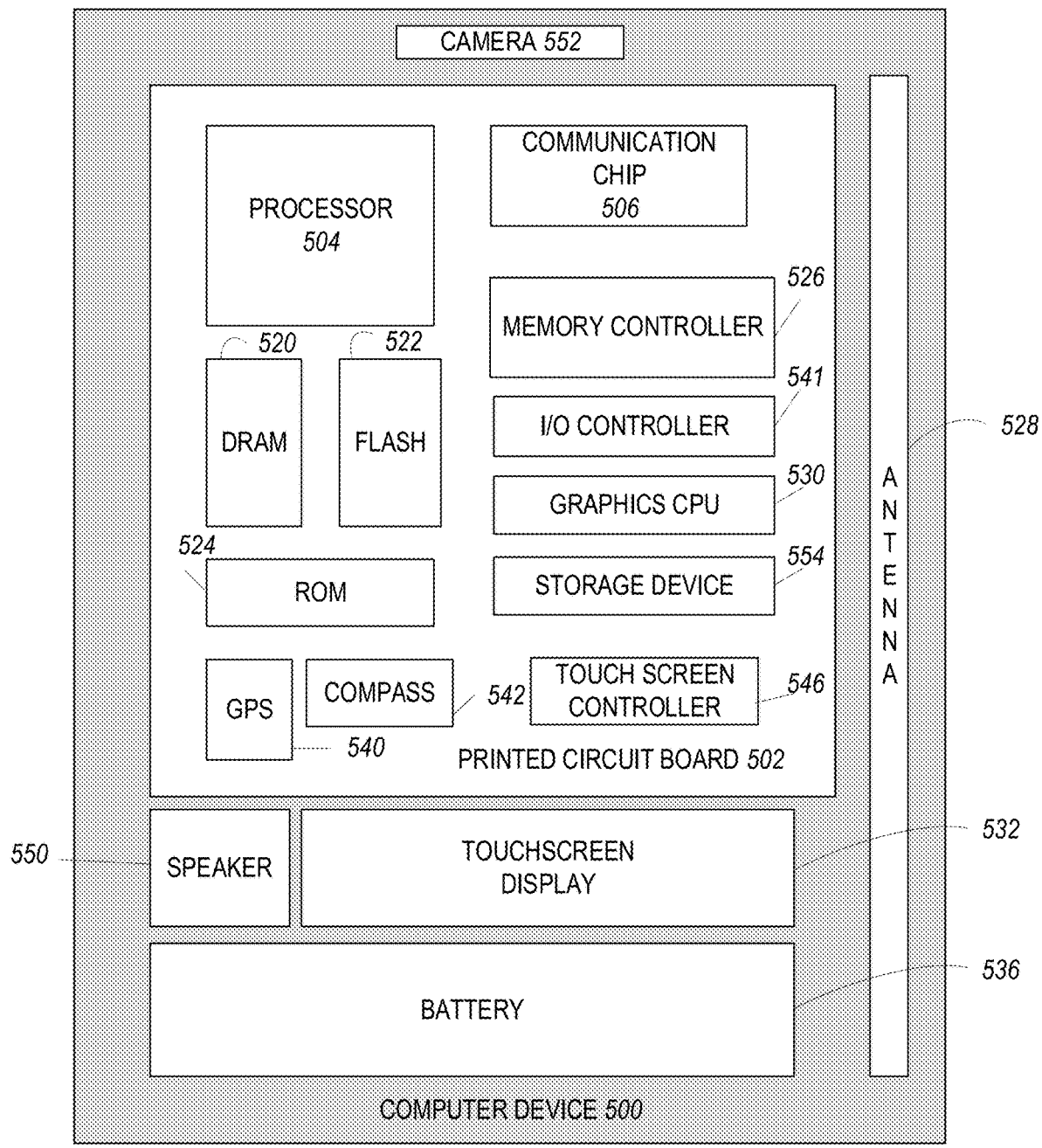
FIG. 5 is a block diagram of an example computer that can be used to implement some or all of the components of the system of FIG. 1, according to various embodiments.

FIG. 5 illustrates an example computer device 500 that may be employed by the apparatuses and/or methods described herein, in accordance with various embodiments. As shown, computer device 500 may include a number of components, such as one or more processor(s) 504 (one shown) and at least one communication chip 506. In various embodiments, the one or more processor(s) 504 each may include one or more processor cores. In various embodiments, the one or more processor(s) 504 may include hardware accelerators to complement the one or more processor cores. In various embodiments, the at least one communication chip 506 may be physically and electrically coupled to the one or more processor(s) 504. In further implementations, the communication chip 506 may be part of the one or more processor(s) 504. In various embodiments, computer device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computer device 500 may include other components that may be physically and electrically coupled to the PCB 502. These other components may include, but are not limited to, memory controller 526, volatile memory (e.g., dynamic random access memory (DRAM) 520), non-volatile memory such as read only memory (ROM) 524, flash memory 522, storage device 554 (e.g., a hard-disk drive (HDD)), an I/O controller 541, a digital signal processor (not shown), a crypto processor (not shown), a graphics processor 530, one or more antennae 528, a display, a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), and so forth.

In some embodiments, the one or more processor(s) 504, flash memory 522, and/or storage device 554 may include associated firmware (not shown) storing programming instructions configured to enable computer device 500, in response to execution of the programming instructions by one or more processor(s) 504, to practice all or selected aspects of the system 100 and/or method 200, described herein. In various embodiments, these aspects may additionally or alternatively be implemented using hardware separate from the one or more processor(s) 504, flash memory 522, or storage device 554.

The communication chips 506 may enable wired and/or wireless communications for the transfer of data to and from the computer device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the computer device 500 may be a laptop, a netbook, a notebook, an ultrabook, a smartphone, a computer tablet, a personal digital assistant (PDA), a desktop computer, smart glasses, or a server. In further implementations, the computer device 500 may be any other electronic device that processes data.

Figure 6:
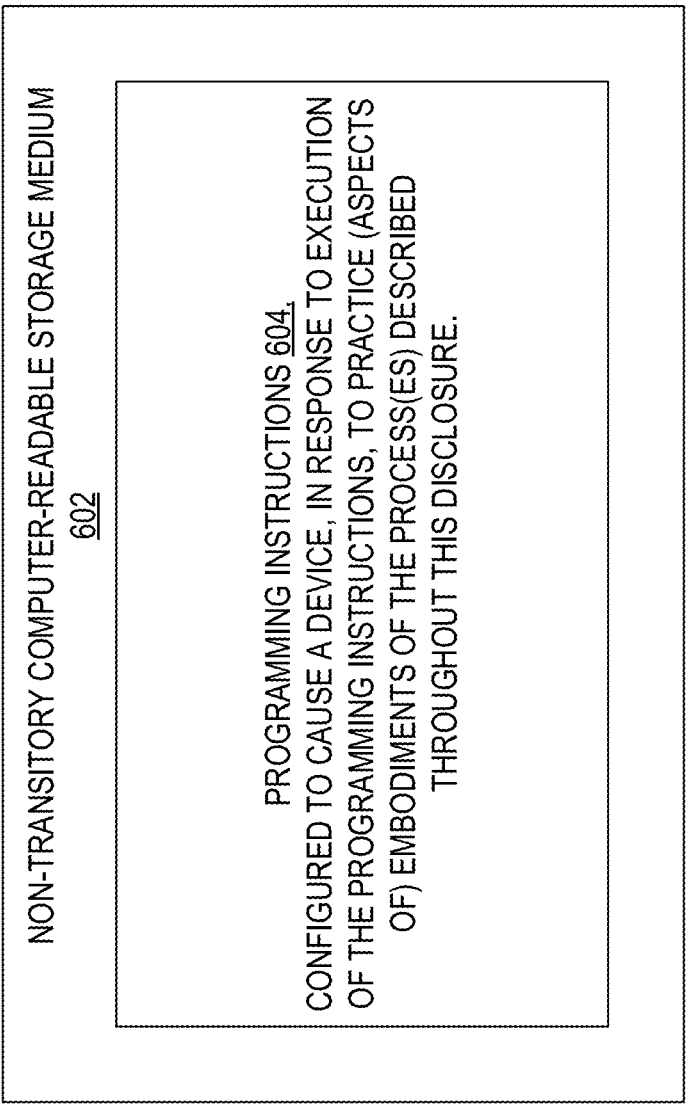
FIG. 6 is a block diagram of a computer-readable storage medium that can be used to implement some of the components of the system or methods disclosed herein, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., computer 500, in response to execution of the programming instructions, to implement (aspects of) system 100 or method 200. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

The invention claimed is:

1. A method comprising:
receiving, at a computing device, a sequence of frames of a scene captured by a camera;
estimating, by the computing device, a camera pose for the camera from the sequence of frames;
generating, by the computing device, a sparse depth map for each frame from the sequence of frames and camera pose, each sparse depth map comprised of at least one 3D point;
densifying, by the computing device for each frame in the sequence of frames, each sparse depth map by comparison of each frame from the sequence of frames with at least two neighboring frames from the sequence of frames, to create a dense depth map for each frame from the sequence of frames;
generating, by the computing device, a 3D mesh from the dense depth maps;
texturing, by the computing device, the 3D mesh by projecting one or more frames from the sequence of frames onto the 3D mesh; and
mapping a coordinate space of the 3D mesh to a coordinate space of the sequence of frames.

2. The method of claim 1, further comprising determining, by the computing device, the at least two neighboring frames for each frame by whether each of the at least two neighboring frames shares at least a predetermined number of points in the sparse depth map with the frame.

3. The method of claim 1, where generating each sparse depth map comprises:
detecting, by the computing device, features within a first frame and within a second frame of the sequence of frames, the second frame being temporally adjacent to the first frame; and
calculating, by the computing device, a depth value for one or more common points on a detected feature within the first frame that matches a detected feature within the second frame.

4. The method of claim 1, further comprising receiving, at the computing device, additional camera pose data with the sequence of frames.

5. The method of claim 4, wherein the camera pose data comprises directly measured depth data.

6. The method of claim 1, further comprising:
passing, by the computing device, each frame of the sequence of frames through a depth estimation network to obtain an estimated depth map;
rendering, by the computing device from the sparse depth map, a depth map representing a camera view; and
fitting, by the computing device, the camera view depth map to the estimated depth map to obtain a depth map with an estimated metric scale.

7. A non-transitory computer readable medium (CRM) comprising instructions that, when executed by an apparatus, cause the apparatus to:
receive, at the apparatus, a video stream comprised of a sequence of frames, each of the sequence of frames comprising an image;
estimate a camera pose from the sequence of frames;
generate a sparse depth map from the sequence of frames and estimated camera pose;
densify, for each frame in the sequence of frames, the sparse depth map by comparison of each frame from the sequence of frames with at least two neighboring frames from the sequence of frames, to create a dense depth map;
generate a 3D mesh from the dense depth map;
texture the 3D mesh by projecting one or more frames from the sequence of frames onto the 3D mesh; and
map a coordinate space of the 3D mesh to a coordinate space of the sequence of frames.

8. The CRM of claim 7, wherein the instructions are to further cause the apparatus to determine the at least two neighboring frames for each frame by whether each of the at least two neighboring frames shares at least a predetermined number of points in the sparse depth map with the frame.

9. The CRM of claim 7, wherein the instructions are to further cause the apparatus to:
detect features within a first frame and within a second frame of the sequence of frames, the second frame being temporally adjacent to the first frame; and
calculate a depth value for one or more common points on a detected feature within the first frame that matches a detected feature within the second frame.

10. The CRM of claim 7, wherein the instructions are to further cause the apparatus to receive, at the apparatus, additional camera pose data with the sequence of frames.

11. The CRM of claim 10, wherein the camera pose data comprises directly measured depth data.

12. The CRM of claim 7, wherein the apparatus comprises a mobile device or a server.

13. The CRM of claim 7, wherein the instructions are to further cause the apparatus to:
pass each frame of the sequence of frames through a depth estimation network to obtain an estimated depth map;
render, from the sparse depth map, a depth map representing a camera view; and
fit the camera view depth map to the estimated depth map to obtain a depth map with an estimated metric scale.

14. The CRM of claim 13, wherein the instructions are to further cause the apparatus to transmit the textured 3D mesh and estimated metric scale to a remote device.

15. A non-transitory computer readable medium (CRM) comprising instructions that, when executed by a computing apparatus, cause the apparatus to:
pass each frame of a sequence of frames through a depth estimation network to obtain an estimated depth map;
estimate a camera pose from the sequence of frames;
generate a depth map from the sequence of frames;
render a camera view depth map representing a camera view from the generated depth map and camera pose;
fit the camera view depth map to the estimated depth map to obtain an estimated metric scale for each point within the generated depth map; and
map a coordinate space of the camera view depth map to a coordinate space of the sequence of frames.

16. The CRM of claim 15, wherein the generated depth map is a sparse depth map, and wherein the instructions are to further cause the apparatus to compute the sparse depth map by a comparison of features between each frame of the sequence of frames and frames in the sequence of frames that are temporally adjacent to each frame.

17. The CRM of claim 15, wherein the depth estimation network is a deep learning network.

18. The CRM of claim 15, wherein the apparatus is a cloud computing platform.

* * * * *